W. K. ROSE.
SCALE RACK.
APPLICATION FILED JAN. 10, 1913.
1,092,292.
Patented Apr. 7, 1914.
3 SHEETS—SHEET 3.
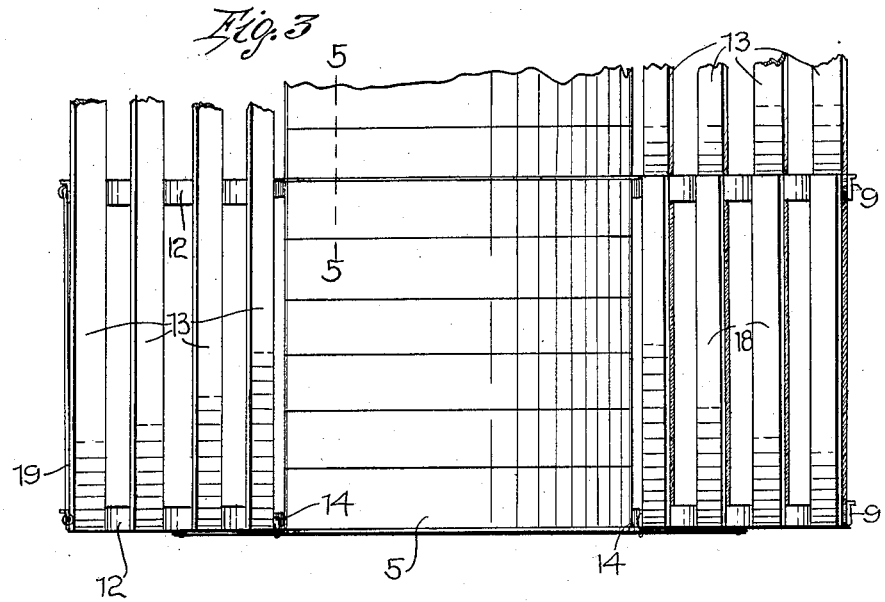
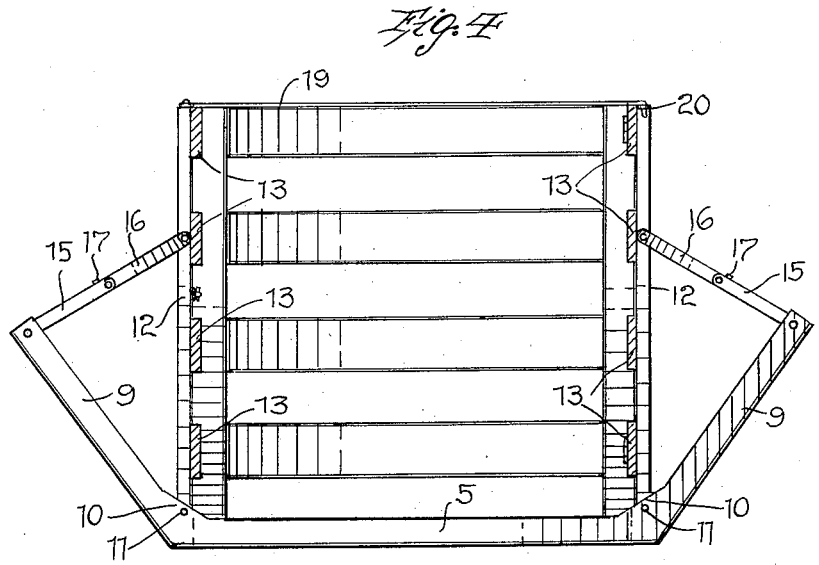
Witnesses
Robert M. Sutphen.
H. F. McDuay.
Inventor
W. K. Rose
By Watson E. Coleman,
Attorney
COLUMBIA PLANOGRAPH CO., WASHINGTON, D. C.

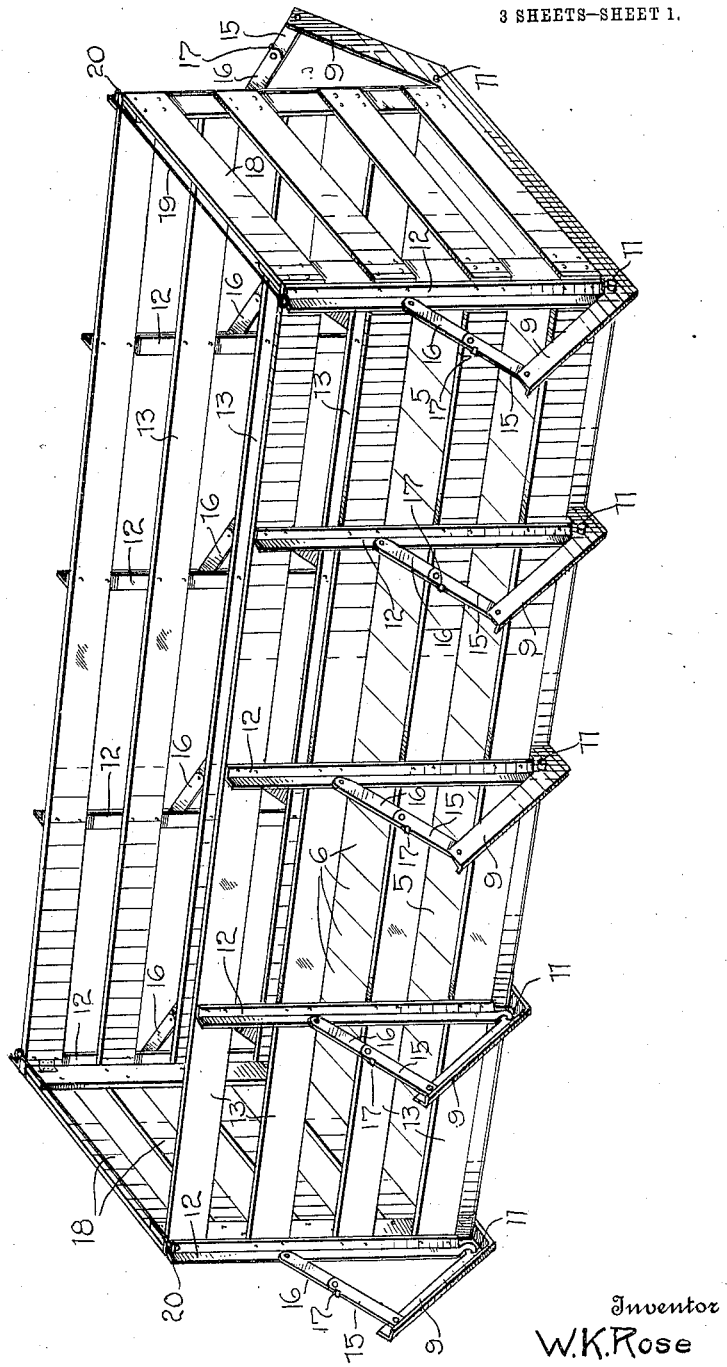

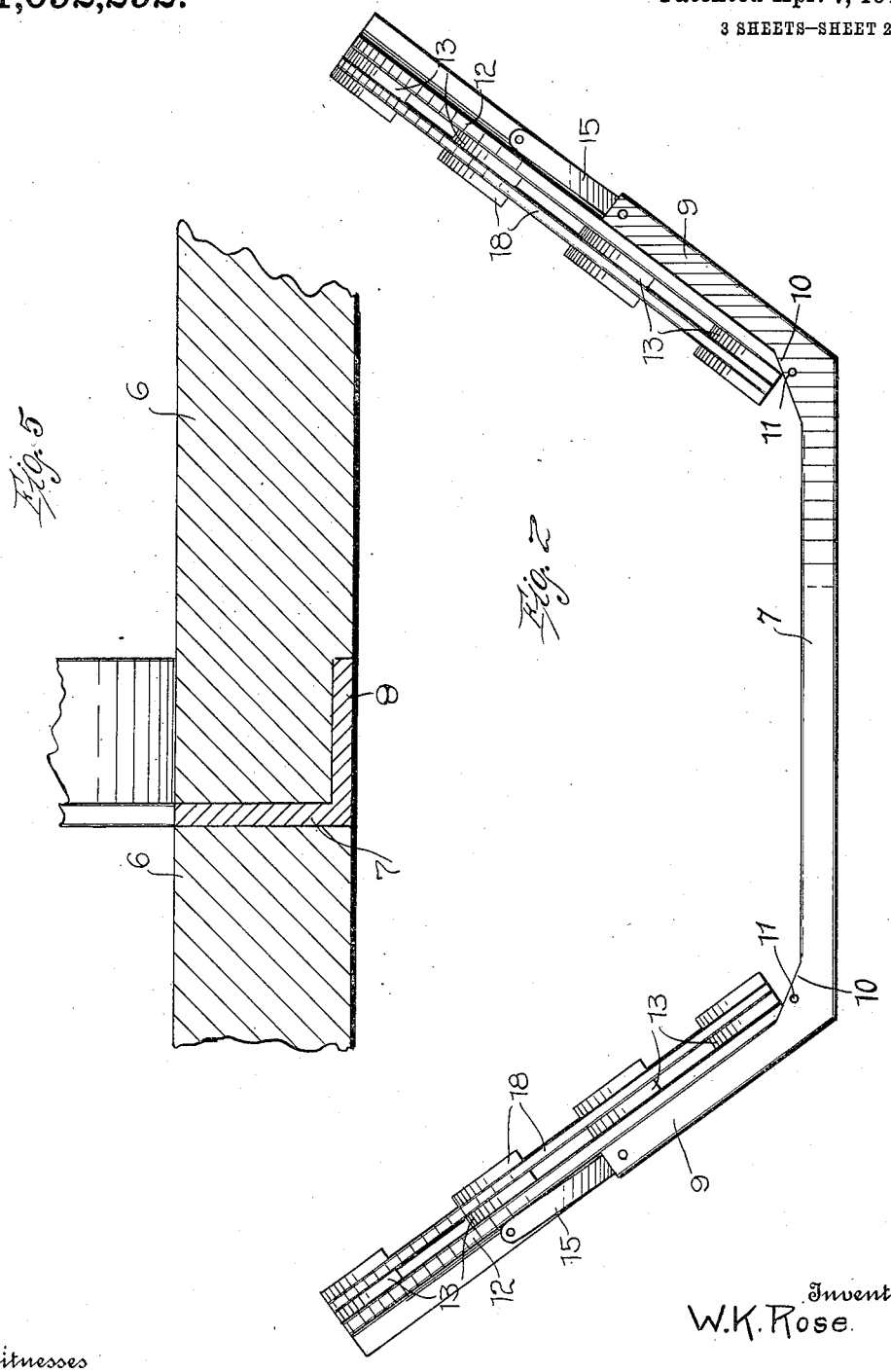

UNITED STATES PATENT OFFICE.

WILFRED K. ROSE, OF FINDLAY, ILLINOIS.

SCALE-RACK.

1,092,292.  Specification of Letters Patent.  Patented Apr. 7, 1914.

Application filed January 10, 1913. Serial No. 741,291.

*To all whom it may concern:*

Be it known that I, WILFRED K. ROSE, a citizen of the United States, residing at Findlay, in the county of Shelby and State of Illinois, have invented certain new and useful Improvements in Scale-Racks, of which the following is a specification, reference being had to the accompanying drawings.

This invention relates to improvements in scale racks and has for its primary object to provide certain novel and desirable improvements in racks of that character commonly employed for weighing live stock and hay or fodder.

A more specific object of the invention is to provide means in a scale rack employed for the above purposes whereby the same may be quickly and easily converted for use either in the weighing of live stock or hay whereby the animals may be closely confined or assembled upon the scale platform, or the supporting area of said platform when hay or similar material is to be weighed, increased to a maximum capacity.

Another object of the invention is to provide a scale rack which is extremely strong and durable in construction, may be manufactured at comparatively small cost and is very reliable and efficient in actual use.

With the above and other objects in view as will become apparent as the description proceeds, the invention consists in certain constructions, combinations, and arrangements of the parts that I shall hereinafter fully describe and claim.

For a full understanding of the invention reference is to be had to the following description and accompanying drawings, in which—

Figure 1 is a perspective view of a scale rack embodying the present invention showing the same arranged for the weighing of live stock; Fig. 2 is an end elevation showing the movable sides of the rack arranged in position upon the platform for the loading of hay thereon. Fig. 3 is a fragmentary top plan view of the device as shown in Fig. 2; Fig. 4 is an enlarged transverse section, the sides of the rack being disposed in their upright positions; and Fig. 5 is a detail section taken on the line 5—5 of Fig. 3.

Referring in detail to the drawings, 5 designates the scale platform which may constitute the bed of a wheeled vehicle, or may form the platform of the scale proper, and may be mounted in any usual or preferred manner. This platform consists of a plurality of planks 6. In the platform a plurality of transversely extending angle iron bars are embodied, the vertical flanges 7 of said bars being disposed between the opposed edges of adjacent planks while the horizontal flanges 8 of the angle bars are countersunk in the lower faces of the planks 6, as shown in Fig. 5 and secured thereto in any preferred manner. The end portions 9 of these angle iron bars are extended outwardly and upwardly from opposite sides of the platform 5 at an obtuse angle to the intermediate body portions of said angle bars. At the juncture of said angular ends and intermediate portions of the angle bars, the vertical flanges thereof are increased in width or reinforced as indicated at 10 and these reinforced portions of the flanges are provided with openings 11 for a purpose which will be later referred to.

The sides of the scale rack each include a series of spaced uprights or standards 12 which are also preferably in the form of angle bars and to one of the flanges of said bars, a plurality of spaced longitudinally extending slats 13 are secured. The lower ends of the standards 12 are reduced and gradually drawn into cylindrical form as indicated at 14, the extremities of these cylindrical lower ends of the angle bars being laterally bent to provide laterally projecting hinged pintles which extend through the openings 11 of the transverse angle bars which are arranged in the scale platform 5. It is to be observed that the pintles of certain of the standards 12 stand in a direction reverse to the pintles of the remainder of the standards whereby it will be readily observed that the sides of the rack thus afforded are effectively maintained in assembled position.

In order to retain the sides of the scale rack in their upright positions for the weighing of live stock, I provide for each of the standards 12, a pair of links designated by the numerals 15 and 16 respectively. The links 16 are pivotally mounted at one of their ends upon the outwardly extending flanges of the standards 12 while the other links 15 are pivotally connected at their outer ends to the upper ends of the obliquely inclined portions 9 of the transverse angle bars. The opposed ends of the links 15 and 16 are pivotally connected and the link 15 is provided with a laterally projecting stop lug 17 which is adapted to engage upon the upper edge of the link 16 and prevent relative movement of said links in one direction. When the stop lug is thus engaged with the link 16, the connecting links between the standards 12 and the ends of the transverse angle bars are substantially in alinement, and serve to retain the sides of the rack in their upright positions and hold the same against movement outwardly under pressure which may be exerted thereon.

To the end standards 12, of one side of the rack, the gates 18 are hingedly connected, suitable latch means being provided for connecting the free ends of said gates to the corresponding standards on the opposite side of the rack. These gates are adapted to fold inwardly against the sides of the rack to which they are connected as clearly shown in Figs. 2 and 3. The gates are adapted to be arranged in their closed positions across the ends of the rack when live stock is being weighed and in order to brace and strengthen the sides of the rack at their ends, I provide the connecting rods 19 which are pivotally mounted at one of their ends upon the end standards 12 of one side of the rack and are provided with hooks on their outer ends for engagement in eyes 20 on the opposed standards. When the opposite sides of the rack are connected by these rods, it will be obvious that the same are securely braced and strengthened so that pressure of the animals against the end gates will not move the sides of the rack from their upright positions or break the joint of the connected links 15 and 16. When the rack is to be used for weighing hay or similar materials the hooks on the ends of the brace bars 19 are adapted to be engaged with the adjacent standards 12 on the same side of the rack, to which said brace bars are connected, thereby supporting said brace rods and obviating liability of the same being bent or broken.

From the foregoing it is thought that the construction and manner of operation of my improved scale rack will be clearly understood. It will be seen that the sides of the rack may be easily and quickly disposed in position upon the angularly disposed end portions 9 of the transverse angle bars or raised to their upright positions when it is desired to weigh live stock. When the sides of the rack are arranged in their outwardly inclined positions and disposed upon the ends of the transverse angle bars, the same are supported and held out of contact with the vehicle wheel hubs so that they will not be worn or injured. It is also obvious that the capacity of the rack is greatly increased so that a large quantity of hay or other material of a like nature may be loaded upon the platform.

The device as a whole consists of comparatively few elements which are of extremely simple form and it will therefore be appreciated that the invention can be produced at small cost. A scale rack constructed in the manner above described is also very substantial and durable in practical use.

It will of course be obvious that the principle of the invention may be embodied in many other forms and I therefore reserve the privilege of making such alterations in the form, proportions and arrangement of the several elements referred to as will fairly fall within the scope of the appended claim.

From reference to Fig. 1, it will be observed that the transversely disposed flanges of the angular end portions 9 of the bars 8 which are arranged at one end of the platform are disposed upon the opposite sides of the vertical standards 12 with relation to the corresponding flanges of the remaining cross bars. Thus it will be apparent that longitudinal shifting movement of the longitudinal frames when the same are disposed in their inclined positions, will be obviated.

Having thus described the invention, what is claimed is:

A device of the character described comprising a plurality of bars having their opposite extremities disposed on upward inclines, a platform supported by the intermediate portions of such bars, side frames each including a plurality of vertical standards, said standards being provided upon their lower ends with laterally directed pintles pivotally mounted in the bars beyond one side of the platform, certain of such pintles being extended in a direction opposite to the remainder of the pintles, and means connecting each of the standards at a point intermediate of its ends to the upper end of the adjacent inclined extremity of one of the bars.

In testimony whereof I hereunto affix my signature in the presence of two witnesses.

WILFRED K. ROSE.

Witnesses:
CHAS. B. GIVEN,
C. E. COVENTRY.

Copies of this patent may be obtained for five cents each, by addressing the "Commissioner of Patents, Washington, D. C."